UNITED STATES PATENT OFFICE.

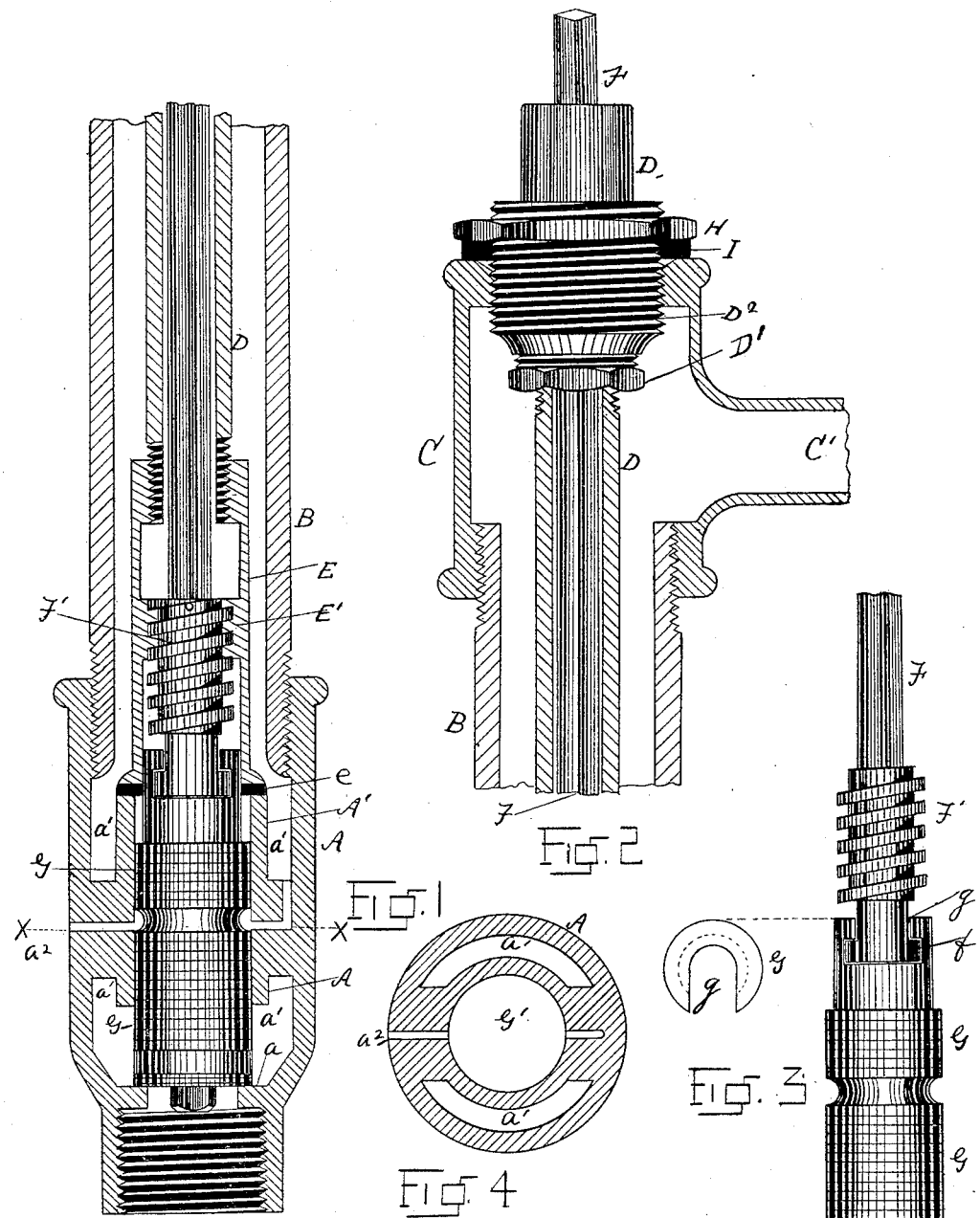

LOUIS MERTENS, OF ERIE, PENNSYLVANIA.

HYDRANT.

SPECIFICATION forming part of Letters Patent No. 453,816, dated June 9, 1891.

Application filed October 9, 1890. Serial No. 367,495. (No model.)

*To all whom it may concern:*

Be it known that I, LOUIS MERTENS, a citizen of the United States, residing at Erie, in the county of Erie and State of Pennsylvania, have invented certain new and useful Improvements in Hydrants; and I do hereby declare the following to be a full, clear, and exact description of the invention, such as will enable others skilled in the art to which it appertains to make and use the same.

This invention relates to hydrants; and it consists in certain improvements in the construction thereof, as will be hereinafter fully set forth, and pointed out in the claim.

The invention is illustrated in the accompanying drawings, as follows:

Figure 1 is a vertical section of the lower part of the hydrant. Fig. 2 is a like view of the upper part of the same. Fig. 3 is an elevation view of the valve detached from the hydrant. Fig. 4 is a cross-section on the line $x\ x$ in Fig. 1.

The construction is as follows:

A is the valve-case, which is of nearly the same construction as in many forms of hydrants, having a valve-seat $a$, a valve-chamber $G'$, a fluid-passage $a'$, a wasteway $a^2$, and means for attaching the supply-pipe at the bottom and the hydrant-pipe or body B at the top.

B is the main pipe or body of the hydrant, and will be of such length as may be desired.

C is the head or top casting of the hydrant, and is provided with a spout $C'$.

D is the valve-rod pipe, on the upper end of which is a head $D^2$, which screws into the head of the hydrant C like a plug, being provided with a wrench-boss $D'$. At the lower end of the valve-rod pipe D there is a foot-piece E, in which is formed a nut $E'$. This foot-piece is seated on the top of the shell of the valve-chamber $G'$, and a gasket $e$ forms a water-tight joint under the pressure that may be obtained by screwing down the head or plug $D^2$. When these parts are thus adjusted, the fluid-passage is between the pipe B and the pipe D, and the interior of the pipe D will be kept perfectly dry. A gasket I and jam-nut H may be used at the top of the head to prevent any escape of water past the screw of the plug $D^2$.

F is the valve rod or stem, which I prefer to make of a square rod so as to form a key-post at the top. At the lower end of the valve-stem there is a screw $F'$, which works in the nut $E'$, above referred to. This screw $F'$ terminates in a swivel-head $f$, which is embraced by a yoke $g$ at the upper end of the valve. This allows the valve-stem and screw F $F'$ to turn, while the valve will only move vertically as the stem is turned. The yoke $g$ on the upper end of the valve is made with an open side, so it can be slipped over the swivel-head on the valve-stem. When the parts are in place, the valve cannot be disengaged, but when the parts are not in place the valve can be slipped on or off the stem quickly. This is of advantage in making repairs of the valve, as it can be quickly detached and replaced.

The leading advantages gained by my construction are that the valve-moving appliances are all inclosed in a separate chamber and kept entirely dry. There is no use of stuffing-boxes, and the construction is extremely simple and cheap.

What I claim as new is—

In a hydrant, the combination, with the valve-shell A, having the valve-chamber $G'$, and the outer pipe B, having the head C, of the inner pipe D, the foot-piece E, having the contained screw $E'$ and seating on the top of the valve-chamber $G'$, the head or plug $D^2$ on the pipe D, screwing into the top of the head C, and the valve-stem F, with screw $F'$ contained within the pipe D and foot-piece E and swiveled to the valve G.

In testimony whereof I affix my signature in presence of two witnesses.

LOUIS MERTENS.

Witnesses:
 JNO. K. HALLOCK,
 H. J. CURTZE.